United States Patent
Jung

(10) Patent No.: US 8,775,002 B2
(45) Date of Patent: Jul. 8, 2014

(54) FAIL-SAFETY CONTROL METHOD FOR HYBRID VEHICLE

(75) Inventor: Jun-Yong Jung, Gunpo-si (KR)

(73) Assignee: Kefico Corporation (KR)

( * ) Notice: Subject to any disclaimer, the term of this patent is extended or adjusted under 35 U.S.C. 154(b) by 70 days.

(21) Appl. No.: 13/619,389

(22) Filed: Sep. 14, 2012

(65) Prior Publication Data

US 2013/0073130 A1    Mar. 21, 2013

(30) Foreign Application Priority Data

Sep. 16, 2011    (KR) .................. 10-2011-0093252

(51) Int. Cl.
| | |
|---|---|
| B60L 9/00 | (2006.01) |
| B60W 50/029 | (2012.01) |
| B60W 50/04 | (2006.01) |
| B60W 20/00 | (2006.01) |

(52) U.S. Cl.
CPC ......... *B60W 20/00* (2013.01); *B60W 2710/083* (2013.01); *B60W 50/029* (2013.01); *B60W 50/045* (2013.01); *B60W 2050/0295* (2013.01); *B60W 20/50* (2013.01); *Y10S 903/902* (2013.01)
USPC .......................... 701/22; 180/65.085; 903/902

(58) Field of Classification Search
CPC .............................. B60W 20/00; B60W 10/08
USPC .................... 701/22; 180/65.285; 903/902
See application file for complete search history.

(56) References Cited

U.S. PATENT DOCUMENTS

| | | | | |
|---|---|---|---|---|
| 5,938,561 | A  * | 8/1999 | Schubert | 477/79 |
| 6,723,014 | B2 * | 4/2004 | Shinso et al. | 474/20 |
| 7,160,225 | B2 * | 1/2007 | Berger et al. | 477/5 |
| 8,548,658 | B2 * | 10/2013 | Rollmann et al. | 701/22 |
| 2007/0112483 | A1 | 5/2007 | Jeong | |
| 2009/0158079 | A1* | 6/2009 | Chung et al. | 714/2 |
| 2010/0004831 | A1* | 1/2010 | Lee | 701/51 |
| 2010/0143156 | A1* | 6/2010 | Kong | 417/44.1 |
| 2011/0320077 | A1* | 12/2011 | Choi | 701/22 |

FOREIGN PATENT DOCUMENTS

| | | |
|---|---|---|
| JP | 2000-152413 | 5/2000 |
| JP | 2004-040993 | 2/2004 |
| JP | 2005-291435 | 10/2005 |
| KR | 10-2007-0050680 | 5/2007 |
| KR | 10-2009-0041024 | 4/2009 |
| KR | 10-2009-0062571 | 6/2009 |

* cited by examiner

*Primary Examiner* — Helal A. Algahaim
*Assistant Examiner* — Shardul Patel
(74) *Attorney, Agent, or Firm* — Wells St. John P.S.

(57) ABSTRACT

Disclosed herein is a fail-safety control method for a hybrid vehicle. The method includes a hybrid control unit which, when commands for demand torque are received from a driver, giving instructions to a motor control unit to generate the demand torque, determining whether or not to a normal torque corresponding to the demand torque is being generated by the motor control unit according to the instructions from the hybrid control unit, and if it is determined that an abnormal torque is being generated by the motor control unit, giving commands to output an interrupt signal to interrupt operation of the motor control unit.

2 Claims, 1 Drawing Sheet

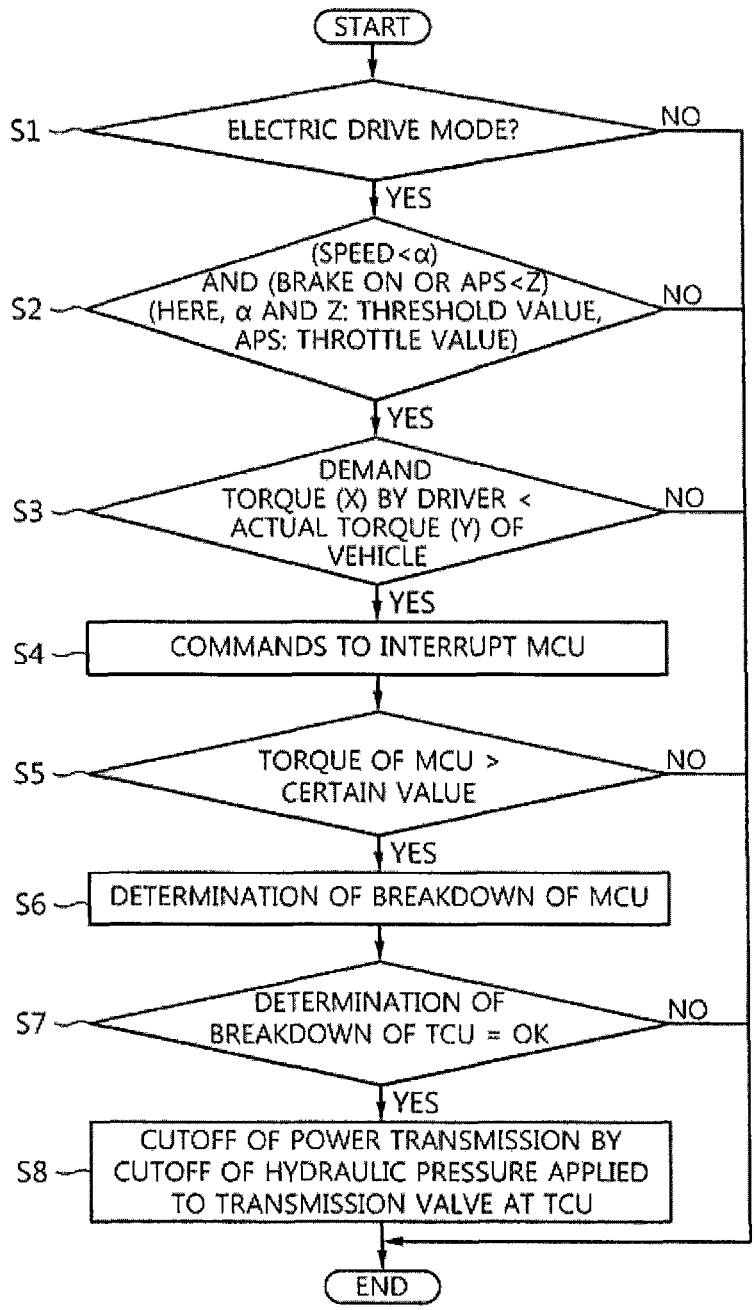

FAIL-SAFETY CONTROL METHOD FOR HYBRID VEHICLE

CROSS REFERENCE TO RELATED APPLICATION(S)

This application claims the benefit of Korean Patent Application No. 2011-0093252, filed Sep. 16, 2011, which is hereby incorporated by reference in its entirety into this application.

BACKGROUND OF THE INVENTION

1. Technical Field

The present invention relates, in general, to a fail-safety control method for a hybrid vehicle which can actively cope with a failure in the motor control unit (MCU).

2. Description of the Related Art

Generally, a hybrid vehicle (HEV) includes an engine control unit (ECU) which controls an engine, a motor control unit (MCU) which controls a motor, a transmission control unit (TCU) which controls a transmission, a battery management system (BMS) which monitors and manages the state of a battery, and a hybrid control unit (HCV) which controls the operation of the control units, sets hybrid drive mode, and controls the overall operation of a vehicle.

The greatest merits of hybrid vehicles are high fuel efficiency and their being environmentally-friendly. However, unlike other vehicles, the hybrid vehicle has to simultaneously control multiple control units (ECU, MCU, TCU, BMS, and HCU), so that there are problems in that it is difficult to perform simultaneous control, and that upon failure in the hybrid vehicle, if there is no active processing, and dangerous situations such as sudden acceleration may occur.

An example of the related art is provided by Korean Unexamined Patent Publication No. 2009-0041024.

SUMMARY OF THE INVENTION

Accordingly, the present invention has been developed keeping in mind the above problems occurring in the prior art, and an object of the present invention is to provide a fail-safety control method for a hybrid vehicle which upon the failure of a motor control unit (MCU), is able to correspondingly perform active processing of a failure using a transmission control unit (TCU), thereby preventing a dangerous situation such as sudden acceleration from occurring.

In order to accomplish the above object, the present invention provides a fail-safety control method for a hybrid vehicle, including: a hybrid control unit, when commands for demand torque are received from a driver, giving instructions to a motor control unit to generate the demand torque; determining whether or not a normal torque corresponding to the demand torque is being generated by the motor control unit according to the instructions from the hybrid control unit; and if it is determined that an abnormal torque is being generated by the motor control unit, giving commands to output an interrupt signal to interrupt operation of the motor control unit.

The method may further include, after giving the commands to output the interrupt signal, determining whether or not the motor control unit is being operated or not, and if it is determined that the motor control unit is being operated, a transmission control unit controlling fail-safety.

In the controlling stage, if it is determined that the motor control unit is being operated, it is determined whether or not the transmission control unit has broken down, and if it is determined that there has been no breakdown, the transmission control unit controls the fail-safety.

The transmission control unit may control the fail-safety by cutting off the hydraulic pressure applied to a transmission valve to cutoff the power transmission.

The method may further include determining whether or not the vehicle is in electric drive mode.

According to the present invention, when a motor control unit (MCU) encounters trouble, fail-safety is controlled by a transmission control unit (TCU), giving the effects of coping with the abnormal torque of a motor control unit, and also active processing is done to ensure the fail-safety of a hybrid vehicle which uses various control units, thereby preventing a dangerous incident such as sudden acceleration from occurring.

BRIEF DESCRIPTION OF THE DRAWINGS

The above and other objects, features and advantages of the present invention will be more clearly understood from the following detailed description taken in conjunction with the accompanying drawings, in which:

FIG. 1 is a flow chart of a fail-safety control method for a hybrid vehicle.

DESCRIPTION OF THE PREFERRED EMBODIMENTS

Reference now should be made to the different drawings, throughout which the same reference numerals are used to designate the same or similar components.

A fail-safety control method for a hybrid vehicle according to the present invention is provided to control the fail-safety of a hybrid vehicle using a transmission control unit (TCU) when a motor control unit (MCU) encounters trouble.

Unlikely other vehicles, a hybrid vehicle has to simultaneously control a multiplicity of control units, so that control is difficult to perform, and processing failures is also important.

The fail-safety control method includes a hybrid control unit which, when commands for demand torque are received from a driver, giving instructions to a motor control unit to generate the demand torque signal, determining whether or not a normal torque signal corresponding to the demand torque is being generated by the motor control unit according to the instructions received from the hybrid control unit, and if it is determined that an abnormal torque signal is being generated by the motor control unit, giving commands to output an interrupt signal to interrupt the operation of the motor control unit.

Since a hybrid vehicle generates torque from an engine and a motor according to commands from the controller, it is important that the torque from the engine and motor be controlled. Further, if unlike the commands, abnormal torque is output from the motor in the state of hydraulic pressure being applied by the transmission control unit (TCU), power is transmitted while the hydraulic pressure is being applied, generating dangerous problems such as the increase in rpm of the engine and sudden acceleration, so that the motor control unit should be interrupted.

That is, if the power transmission is working while hydraulic pressure is being applied, high torque is generated and the rpm increases to cause sudden acceleration to occur, putting a driver in danger.

To prepare for this, if the motor control unit itself encounters trouble, commands are issued to interrupt the operation of the motor control unit, and if despite the commands, the motor control unit continues to operate because of a failure, fail-safety needs to be controlled by the transmission control unit.

To this end, the method further includes, after the stage of issuing the commands, determining whether or not the motor control unit is being operated, and if it is determined that the motor control unit is being operated even though commands to interrupt the motor control unit have been issued, a stage is carried out so that the transmission control unit controls fail-safety.

In the control stage, if it is determined that the motor control unit is being operated and it is determined that there is a failure in the transmission control unit, and if there is no failure, fail-safety is controlled by the transmission control unit.

The transmission control unit controls the fail-safety by cutting off the hydraulic pressure applied to a transmission valve to cutoff the power transmission.

An embodiment of the present invention will now be described with reference to the flow chart of FIG. 1.

As illustrated in FIG. 1, the fail-safety control method for a hybrid vehicle first determines whether or not the hybrid vehicle is in electric drive mode (S1). In electric drive mode, the vehicle uses a battery and an electric motor.

If Si determines that the vehicle is in electric drive mode, it is determined whether or not vehicle speed is less than a threshold value (α), and whether a brake is ON or whether a throttle value (a value of accelerator pedal position sensor (APS)) is less than a threshold value (Z) (S2).

The determination of S2 is made to determine whether the vehicle is put on standby to drive, or is being driven at middle or low speed. The threshold value (α) of speed may be 20 (km/h).

If S2 determines that the speed of the vehicle is less than 20 km/h, it is determined that the vehicle is on standby to drive or is being driven at low speed. Further, if S2 determines that either condition of the brake being in ON state or the throttle value (APS) being less than the threshold value (Z) has been satisfied, it is determined whether or not the demand torque (X) of a driver is less than actual torque of the vehicle (Y) (S3).

The brake being in an ON state is determined to be standby to drive, and if the throttle value (APS) is less than the threshold value (Z) this is determined as saying that the vehicle is being driven at low speed. Although it is not designated, the threshold value (Z) of the throttle value may use a predetermined value.

If S3 determines that the demand torque (X) of a driver is less than the actual torque (Y) of the vehicle, commands are issued to interrupt the operation of the motor control unit (MCU) (S4).

Here, the demand torque (X) of a driver is the torque value that occurs when commands are received to generate the demand torque, and a hybrid control unit instructs the motor control unit to generate torque signal. Also, the actual torque (Y) of a vehicle is the actual torque that is output from a motor by the motor control unit controlling the motor in response to instructions of the hybrid control unit to generate torque.

Saying that the demand torque (X) of the driver is less than the actual torque (Y) means that there has been a breakdown of the motor control unit. When the motor control unit has broken down, unlike the commands of the hybrid control unit (HCU) that are issued in response to the reception of commands for demand torque issued by a driver, the motor control unit controls the motor so that the motor outputs an abnormal torque.

Commands for interrupting the operation of the MCU are issued by the HCU.

After issuing commands for interrupting the operation of the MCU in S4, it is determined whether or not the torque (torque signal) of the MCU exceeds a certain value (S5).

The determination of S5 is for determining whether or not the MCU has broken down. Here, the determination of the breakdown of the MCU is made to determine whether or not the MCU is still being operated even though the HCU has issued commands that the operation of the MCU be interrupted. If the MCU generates a torque signal above a certain value, it means that the MCU is being operated.

If it is determined that the MCU generates a torque signal above a certain value, the MCU is determined to be broken down (S6), and then it is determined whether or not the transmission control unit (TCU) is broken down (S7). The determination of S7 is made to determine whether or not the TCU is operating normally.

If it is determined that the TCU is operating normally, the TCU controls the fail-safety by cutting off hydraulic pressure applied to a transmission valve to cutoff the power transmission (S8).

The cutoff of the power transmission reduces or restricts the engine output torque so as to control the fail-safety. This method gives the effect of actively processing the fail-safety of a hybrid vehicle which uses various control units thereby preventing dangerous incidents such as sudden acceleration from occurring.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fail-safety control method for a hybrid vehicle, comprising:
a instruction step that a hybrid control unit gives instructions to a motor control unit to generate the demand torque signal when commands for a demand torque are received from a driver;
a first determining step that determines whether or not a normal demand torque signal according to the instructions from the hybrid control unit is being generated by the motor control unit;
a command step that gives commands to output an interrupt signal to interrupt an operation of the motor control unit, if it is determined that an abnormal torque signal is being generated by the motor control unit; and
wherein the method further comprises:
a second determining step that determines whether or not the motor control unit is being operated or not after giving the commands to output the interrupt signal;
a control step that a transmission control unit controls fail-safety if it is determined that the motor control unit is being operated in the second determining step; and
wherein in the control step, if it is determine that the motor control unit is being operated and that there has been no breakdown in the transmission control unit, the transmission control unit controls the fail-safety; and
wherein the transmission control unit controls the fail-safety by cutting off hydraulic pressure applied to a transmission valve to cutoff a power transmission.

2. The fail-safety control method according to claim 1, wherein the method further comprises a third determining step that determines whether or not the vehicle is in electric drive mode.

* * * * *